United States Patent Office 3,084,171
Patented Apr. 2, 1963

3,084,171
5-NITRO-2-FURYLAMIDINE AND ALKYL 5-NITRO-2-FURYLIMIDATE
Anne Mary Von Esch, North Chicago, Ill., and William Reese Sherman, University City, Mo., assignors to Abbott Laboratories, North Chicago, Ill., a corporation of Illinois
No Drawing. Filed Oct. 19, 1961, Ser. No. 146,365
3 Claims. (Cl. 260—347.7)

The present invention is concerned with compounds derived from 5-nitro-2-furylnitrile and more particularly with novel compounds of the formula

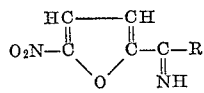

wherein R is loweralkoxy of from 1 to 4 carbons inclusive or amino and methods for their preparation. These compounds are crystalline solids which are substantially insoluble in water. The compounds wherein R is loweralkoxy are intermediates for the preparation of the compound wherein R is amino, the latter compound of which is an active antibacterial agent especially against such organisms as *Salmonella typhimurium* and *Proteus vulgaris*. In such use, the compound can be dispersed on an inert, finely divided solid and employed as a dust or dispersed in water and employed as a spray or in other ways well known to those skilled in the art. In a representative operation, 5-nitro-2-furylamidine hydrochloride completely inhibited the growth of the above-named organisms when employed as an aqueous composition containing 50 parts by weight of said compound per million parts by weight of ultimate mixture.

The compounds wherein R is loweralkoxy are readily prepared by the reaction of equimolecular amounts of 5-nitro-2-furylnitrile and an alcohol containing 1 to 4 carbons in an inert solvent such as ether which is saturated with hydrogen chloride. The reaction is carried out at room temperature. The white solid which forms is then separated and treated with ammonia to obtain the corresponding alkyl 5-nitro-2-furylimidate. Further reaction of these compounds with ammonium chloride in an alcohol such as methanol at the reflux temperature results in the formation of 5-nitro-2-furylamidine hydrochloride which can be purified by recrystallization from a suitable organic solvent such as pyridine.

The following examples illustrate the invention in more detail but are not to be construed as limiting.

EXAMPLE 1

*Ethyl 5-Nitro-2-Furylimidate*

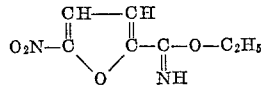

6.9 grams (0.05 mole) of 5-nitro-2-furylnitrile and 2.3 grams (0.05 mole) of anhydrous ethanol was dissolved in 50 ml. of anhydrous ether and hydrogen chloride was passed through the resulting solution for 2 hours. The white precipitate which formed was removed by filtration and suspended in liquid ammonia. Upon evaporation of the ammonia, the residue was extracted with boiling carbon tetrachloride to obtain the desired ethyl 5-nitro-2-furylimidate as a crystalline white solid which melted at 73°–74° C. and contained 15.00% nitrogen compared to the calculated value of 15.21% nitrogen.

If desired, methanol, propanol or butanol can be substituted for the ethanol in this example to obtain methyl 5-nitro-2-furylimidate, propyl 5-nitro-2-furylimidate and butyl 5-nitro-2-furylimidate, respectively.

EXAMPLE 2

*5-Nitro-2-Furylamidine Hydrochloride*

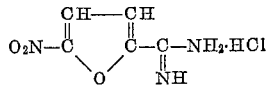

A mixture of 9.2 grams (0.05 mole) of ethyl 5-nitro-2-furylimidate and 2.7 grams (0.05 mole) of ammonium chloride was refluxed in 225 ml. of methanol for 4 hours. The reaction mixture was then concentrated to 25 ml. to which was added 100 ml. of ether. The desired 5-nitro-2-furylamidine hydrochloride precipitated as a white solid which after recrystallization from pyridine melted at 247°–249° C. with decomposition. Upon analysis, the product was found to contain 21.82% nitrogen compared to the theoretical value of 21.93% nitrogen.

In a similar manner, methyl, propyl or butyl 5-nitro-2-furylimidate can be refluxed with NH$_4$Cl to obtain 5-nitro-2-furylamidine hydrochloride.

5-nitro-2-furylnitrile employed as a starting material is a known compound melting at 64° C. and can be readily prepared by heating equimolar amounts of 5-nitro-2-furylamide and phosphorus oxychloride at 100° C. until the evolution of hydrogen chloride ceases. The reaction mixture is then poured on ice and the solid which forms is filtered off and recrystallized from carbon tetrachloride.

What is claimed is:

1. Compounds of the formula

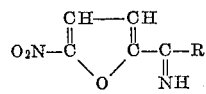

wherein R is loweralkoxy.
2. Ethyl 5-nitro-2-furylimidate.
3. 5-nitro-2-furylamidine hydrochloride.

References Cited in the file of this patent

Dunlop et al.: Furans, ACS Monograph No. 119 (1953), pages 536–7 and 546.